United States Patent
Lee

(10) Patent No.: US 6,927,541 B2
(45) Date of Patent: Aug. 9, 2005

(54) MULTIMODE MOTION-ACTIVATED LIGHTING

(75) Inventor: Wade Lee, Danville, CA (US)

(73) Assignee: EML Technologies LLC, Danville, CA (US)

(*) Notice: Subject to any disclaimer, the term of this patent is extended or adjusted under 35 U.S.C. 154(b) by 0 days.

(21) Appl. No.: 10/462,368

(22) Filed: Jun. 16, 2003

(65) Prior Publication Data

US 2004/0047153 A1 Mar. 11, 2004

Related U.S. Application Data

(60) Provisional application No. 60/388,978, filed on Jun. 14, 2002.

(51) Int. Cl.[7] .............................................. H05B 37/00
(52) U.S. Cl. ..................... 315/159; 315/157; 315/158; 340/555
(58) Field of Search ................... 315/149, 159, 315/157, 158, 156, 150; 340/555

(56) References Cited

U.S. PATENT DOCUMENTS

| | | | | |
|---|---|---|---|---|
| 5,598,066 A | * | 1/1997 | Wiesemann et al. | ........ 315/159 |
| 5,646,594 A | * | 7/1997 | Barben et al. | .............. 340/567 |
| 5,668,446 A | * | 9/1997 | Baker | .......................... 315/159 |
| 5,699,243 A | * | 12/1997 | Eckel et al. | ................. 315/159 |
| 6,225,748 B1 | * | 5/2001 | Evans et al. | ................. 315/159 |

* cited by examiner

*Primary Examiner*—Don Wong
*Assistant Examiner*—Ephrem Alemu
(74) *Attorney, Agent, or Firm*—Elliot B. Aronson

(57) ABSTRACT

A motion detector circuit arrangement having multiple modes of operation for energizing a light at a nominal full-brightness illumination level in response to motion. Background level circuitry provides a dual-use lighting level signal that indicates the background levels with which the light may be energized in the absence of motion when operating in the various modes. The dual-use level signal is applied to cause the light to be energized at the desired background level and is further applied to set at least one other characteristic of the motion-activated light associated with the selected background level. The dual-use level signal may be applied to activate and establish an intermediate background lighting level to provide accent mode lighting and also be applied to disable a manual override capability. The manual override capability is preserved in security mode so that it will operate when these is no background lighting.

9 Claims, 2 Drawing Sheets

MULTIMODE MOTION-ACTIVATED LIGHTING

This application claims the benefit of provisional application No. 60/388,978 filed Jun. 14, 2002.

BACKGROUND OF THE INVENTION

The present invention relates to passive infrared motion detectors of the type used, for example, in residential lighting fixtures to illuminate a walkway or driveway when a person or automobile approaches. The invention is more particularly directed to various aspects of the electronics for controlling the operation of the motion detector including among other aspects electronic circuitry providing a variety of modes of operation for the motion detector and lighting fixture.

An early form of automatic lighting intended for outdoor use was controlled by a photocell that responds to the presence of daylight to automatically distinguish night from day. This form of lighting comes on at nightfall and remains on all night long until the light of dawn falls on the photocell to signal the arrival of day and trigger the nighttime lighting to be turned off. Such lighting has come to be known as dusk-to-dawn lighting. Another form of automatic lighting is motion-activated lighting governed by a passive infrared (PIR) motion detector. This form of lighting comes on when an infrared-emitting target such as a person or an automobile moves in the field of view of the motion detector. When such lighting was first introduced, it operated in a mode commonly known as security mode, in which the light remains off until motion is detected and then comes on for a pre-set period, typically about 15 minutes, in response to the motion. The light is then automatically extinguished if no further motion is detected for the pre-set period.

In a parallel development lighting fixtures providing background illumination at a low level have long been used in landscape and architectural design to focus attention on such features as walkways and garden paths, trees and prominent shrubbery, statuary and garden art, and ornamental building elements. Such lighting is commonly referred to as accent lighting and typically provides illumination at levels significantly less than full brightness. Motion-activated lighting was later combined with accent lighting to provide a motion-activated lighting apparatus in which the light comes on automatically at nightfall at an intermediate, accent lighting level and then when motion is detected, comes on at full brightness in response to the motion. When no motion is detected for the pre-set period, the light returns to the accent level. This mode of motion-detector operation has come to be known as accent mode.

Some PIR motion-activated lighting fixtures can be operated in more than one mode. U.S. Pat. No. 5,598,066 of Wiesemann et al. discloses a motion-activated lighting apparatus that can be operated in either security mode or in accent mode. The apparatus includes a switch by which the user can select the desired mode. U.S. Pat. No. 6,225,748 of Evans et al. discloses a motion-activated lighting apparatus in which the background lighting level can be continuously adjusted from full bright through intermediate levels suitable for accent lighting to no background lighting at all. When the user selects full bright, the apparatus operates in dusk-to-dawn mode. When the user selects no background lighting, the apparatus operates in traditional security mode. For mid-range selections the apparatus operates in accent mode with adjustable accent level.

Some PIR motion detectors, including those of the above U.S. Pat. Nos. 5,598,066 and 6,225,748, provide a manual override feature by which the user can completely bypass the normal mode of operation and manually turn on the light at its full brightness level regardless of whether the unit was set to operate in security mode or accent mode. The user typically toggles a wall switch controlling power to the lighting fixture to disable the normal mode of operation, whatever it may be, and energize the light at its full brightness level.

SUMMARY OF THE INVENTION

The present invention provides a method and circuit arrangement for use in PIR motion-activated lighting that provides a degree of flexibility in customizing multiple modes of operation that has not previously been available in multimode motion-activated lighting. The circuit arrangement enables different features, characteristics or functions to be associated with the different modes in a particularly simple way that introduces few additional circuit components and thereby facilitates cost-effective manufacture.

Briefly, the circuit arrangement includes a PIR motion detector for energizing a light at a nominal full-brightness illumination level in response to motion and further includes background lighting level circuitry for setting a plurality of background lighting levels in the absence of motion. The background levels may be substantially full brightness for dusk to dawn mode, or an intermediate level suitable accent lighting for use in accent mode, or a zero lighting level for security mode. The background level circuitry provides a dual-use lighting level signal that indicates the background levels with which the light may be energized in the absence of motion when operating in the various modes available. The dual-use level signal is applied so as to cause the light to be energized at the desired background level associated with a user-selected mode of operation. The dual-use level signal is further applied to set at least one other characteristic of the motion-activated light associated with the selected background level.

In one aspect of the invention for example the dual-use level signal may be applied to activate and establish an intermediate background lighting level to provide accent mode lighting and also be applied to disable a manual override capability so as to avoid wasteful energy usage in energizing the light at full brightness in the absence of motion when the accent lighting level already provides a convenient illumination level. In this example the manual override capability of the system is still preserved in security mode so that the manual override feature will operate when there is no background lighting level at all, that is, when it is dark in the absence of motion.

In another aspect of the invention, motion detector circuitry for energizing a light is provided that has a security mode of operation, an accent mode of operation and a dusk to dawn mode of operation, but in which the manual override operates only in the security mode and not in the accent mode. In particular, an elegant circuit arrangement for disabling the manual override in accent mode is provided.

In yet another aspect of the invention, a method and circuit arrangement are provided for providing a triggering signal for firing a triac at an intermediate duty cycle for providing an intermediate background lighting level for use in an accent mode by having an accent mode reference level float with the AC power supply for the motion detector.

In yet another of its aspects the invention provides a particularly advantageous circuit arrangement for transient blanking circuitry that uses very few components.

Other aspects, advantages, and novel features of the invention are described below or will be readily apparent to those skilled in the art from the following specifications and drawings of illustrative embodiments.

DETAILED DESCRIPTION OF ILLUSTRATIVE EMBODIMENTS

Figure 1:
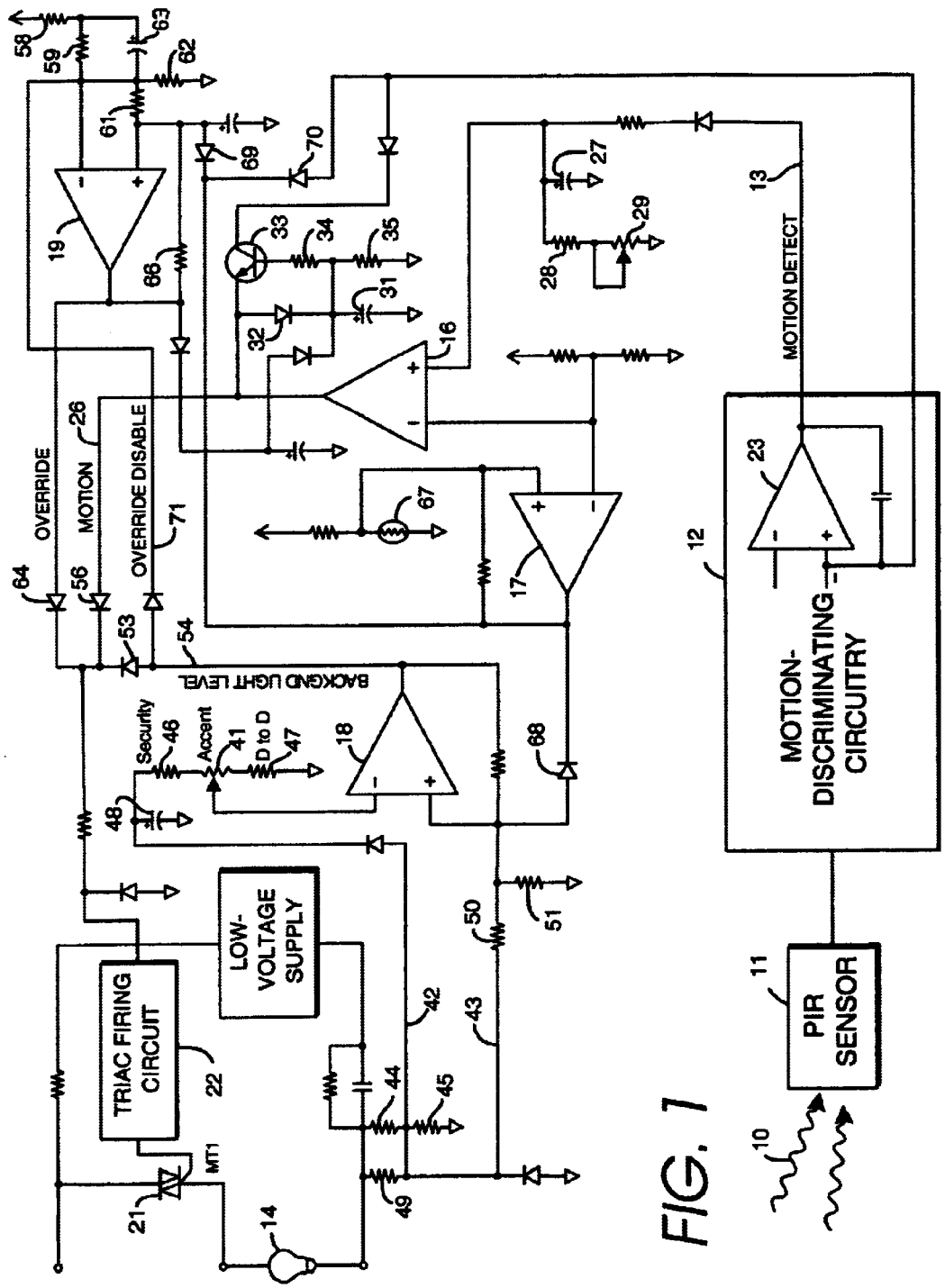
FIG. 1 is a block schematic circuit diagram for an embodiment of circuitry for practicing the invention.

FIG. 1 shows a circuit arrangement for an infra-red motion detector incorporating an embodiment of the invention. By way of background on motion detectors, infra-red energy 10 from a monitored field of view impinges upon an infra-red sensor 11, which provides an output signal characteristic of the incident infra-red energy. Motion-discriminating circuitry 12 receives the sensor output signal and determines whether the incident infra-red energy is characteristic of a moving target such as a person moving about in the field of view of the device. If such a desired target is found, then motion-discriminating circuitry 12 provides a signal along line 13, labeled in the Figure as a Motion Detect signal, indicating that motion has been detected.

A number of circuit arrangements and design philosophies are known for discriminating a signal representing movement of a desired target from the sensor output signal. Any such circuit arrangement and design philosophy may be used herein provided only that a signal is provided when motion from a desired target is successfully discriminated. Thus, for example, the present invention may be used to advantage with thresholding discriminators and with pulse-counting discriminators, which are both commonly found in PIR motion detectors. The use of such discrimination arrangements is common, and their structure and operation are well known to those of ordinary skill in the art and need not be described in any detail here. Furthermore, it is not even necessary that the motion detection be based on detection of infrared energy. The invention may also be used with other types of detection schemes such as optical (i.e., visible light) arrangements or even acoustical, microwave or combination arrangements.

The circuit of FIG. 1 further includes the following subsidiary circuitry that is discussed in more detail below. Op amp 16 and associated components provide a transient blanking circuit for preventing transients that are generated when the light is extinguished from re-triggering the light. Op amp 17 and associated components provide a daylight blanking circuit for keeping the light off during daylight hours. Op amp 18 and associated circuitry provide for several modes of operation as will be set out more fully below. Op amp 19 and associated components provide a manual override circuit enabling a user to turn on the light manually from a wall switch in at least one of the modes of operation. Light 14 is energized by a triac 21, which is fired by triac firing circuit 22 in response to an appropriate triggering signal. The particular triac firing circuit used is not important to the invention in its broad application, and in fact it is not even necessary that the light be energized by a triac. A relay or other switching arrangement could also be used.

When a sufficiently strong infrared signal characteristic of motion impinges upon sensor 11, motion-discriminating circuitry 12 provides a logic High at its output along line 13. Block 12 shows the final output op amp 23 of the motion-discriminating circuitry. This logic High serves as an indicator that motion has been detected. The logic High is applied through op amp 16 along line 26 labeled "MOTION" in FIG. 1 to triac-firing circuit 22, which in turn switches on triac 21 to energize lamp 14 at its nominal full-power level, i.e., nominal full-brightness level.

Once the light is energized in response to a Motion Detect High on line 13, the light remains energized after motion is detected for a duration determined by the RC circuit comprising capacitor 27 and resistors 28 and 29. When the light is then de-energized, transients generated in the circuit can re-trigger the light. To prevent this from occurring, the circuit of FIG. 1 includes transient blanking circuitry controlled by op amp 16. This transient blanking circuitry is advantageous in that it uses very few components—only an op amp and a few miscellaneous components. In the triggered state when motion is detected, the High on line 13 is applied to op amp 16 causing it to go High. The High at the output of op amp 16 charges capacitor 31 through diode 32, turning on transistor 33, which is connected to the + input of motion-discriminating output op amp 23. However, with a High at the output of op amp 16, transistor 33 is effectively blocked and cannot pull any current from the input of op amp 23, and so will have no effect. Thus, as long as there is a High at the output of op amp 16, indicating motion, light 14 will be in its energized state. When motion is detected, the resulting High at the output of op amp 23 charges capacitor 27. The charge on capacitor 27 maintains op amp 23 in its High state. When no motion is detected, capacitor 27 begins to discharge. When capacitor 27 has discharged to a critical level, the potential on the non-inverting input of op amp 16 drops and op amp 16 goes to its Low state. With a Low at the output of op amp 16, the light is de-energized and turns off. The charge on capacitor 31, however, maintains transistor 33 in its conducting state for a brief moment controlled by the RC time constant for capacitor 31 and resistors 34 and 35. During this period transistor 33 is able to draw current out of the non-inverting input of op amp 23 causing op amp 23 to be blanked out so that it is unable to respond to any transient caused when the light is de-energized. After capacitor 31 times out, transistor 33 goes to its non-conducting state and op amp 23 is freed up to respond to incoming signals again.

The circuit of FIG. 1 allows for three independent modes of nighttime operation referred to herein as security mode, accent mode, and dusk-to-dawn mode. In security mode the lamp remains off until motion is detected, at which point it is energized at substantially full brightness. The light then stays on for a pre-set duration after motion is detected, typically about fifteen minutes. In accent mode the lamp comes on at nightfall at an intermediate brightness level, typically about half brightness, until motion is detected, at which point it is energized at substantially full brightness for the pre-set duration and then returns to the intermediate brightness level. In dusk-to-dawn mode the motion detection capability is disabled. The lamp comes on at nightfall at substantially full brightness and stays on until daylight, at which point it is extinguished.

The mode is selected by a mode switch, which in the embodiment of FIG. 1 is provided by potentiometer 41. This switch controls the voltage applied to the inverting input of op amp 18. To appreciate the operation of potentiometer 41 as a mode-selection switch, note that the AC power is applied across both inputs to op amp 18 along the line 42 and line 43, the voltage being divided down differently along the two lines to form two different voltage divided AC signals, which are compared at op amp 18. On line 42 the voltage is divided by the voltage divider formed by resistors 44–47, and potentiometer 41 along with the reactance across capacitor 48. On line 43 the voltage is divided by the voltage divider formed by resistors 49–51. Capacitor 48 serves to shift the relative phase of the two voltage divided AC signals. The result is that op amp 18 provides a signal indicating the background level at which lamp 14 is to be energized in the various modes of operation.

The dusk-to-dawn mode is activated when potentiometer 41 is in its bottommost position. In this position the inverting input of op amp 18 is close to circuit ground, and the voltage on line 43 applied to the −input of op amp 18 is less than that on line 42 through all or almost all of the AC cycle. Op amp 18 is maintained substantially at its High output level throughout the AC cycle. The High is applied to triac-firing circuit 22 through diode 53 along line 54 labeled "Background Lighting Level," which in turn fires the triac to energize the lamp throughout substantially all of the AC cycle so as to energize the lamp substantially at its full brightness.

The security mode is activated when potentiometer 41 is in its uppermost position. In this position the voltage on line 42 is greater than that on line 43 through all or almost all of the AC cycle. This applies a sufficiently large voltage to the inverting input of op amp 18 to shut down the op amp so that a Low appears at its output through all or most of the AC cycle. The Low at the output will not trigger the triac. In this mode no triggering High ever occurs on line 54. At night the light remains off until motion is detected or until it is manually energized through a manual override mechanism such as that described below.

The accent mode is activated when potentiometer 41 is in an intermediate position. In this position the voltage on line 42 is less than that on line 43 for only a portion of the AC cycle. Comparator 18 gives a High output for that portion of the AC cycle. In effect, the +input to op amp 18 is pulsed with respect to the level applied to the −input, producing a pulsed High at the output with a duty cycle depending on the setting of potentiometer 41. That is, the AC signal applied to the inverting input may be thought of as a floating reference-level that floats along with the phase-shifted and scaled AC signal applied to the non-inverting input.

The pulsed output signal is applied to triac-firing circuit 22 along line 54 to energize the lamp for only an intermediate portion of the AC cycle with the result that the lamp is energized during each AC cycle for only a fraction of the AC cycle, usually substantially less than the full cycle, yielding an intermediate brightness level. Thus, the pulsed signal from op amp 18 determines the background lighting level in accent mode. In general, the Background Lighting Level signal has a duty cycle indicative of the operative background level. For Security mode the duty cycle is 100%, for Dusk to Dawn mode it is 0%, and for Accent mode it is an intermediate value.

When motion is detected in Accent mode, a High is applied to the triac firing circuit through op amp 16 and diode 56 to energize the lamp at the full brightness level for the pre-set duration. When capacitor 27 times out, the output of op amp 16 goes Low, and the light returns to the intermediate brightness level triggered by the pulsed signal on Background Lighting Level line 54.

The circuit arrangement for producing the accent mode also provides protection against power dips in the AC mains. Due to hysteresis in op amp 18, it is possible that after a power dip the light might not come back in the accent mode. To provide a measure of stability, the DC voltage that activates the accent mode is floating with respect to the AC line voltage applied to both lines 42 and 43. The circuit arrangement, and in particular capacitor 48, effectively tracks the average AC voltage averaged over a small number of cycles, thereby minimizing the effect of transient AC power dips or other irregularities or noise on the AC power lines.

Although the mode selection switch is provided in the illustrative circuit of FIG. 1 as potentiometer 41, other forms of switch can also be used. For example, a three-position switch can be used to switch between the appropriate resistances in the voltage divider to achieve the three modes. A potentiometer, however, may be preferred over a three-position switch in practice. If a three-position switch is used, the position corresponding to accent mode will then switch in the appropriate resistors to achieve the desired intermediate brightness level. Since the actual resistances of resistors vary in practice generally within the manufacturing tolerances, the intermediate brightness level will depend on the particular resistors used and may be too bright or not bright enough in any particular unit. Thus, more expensive components with lower tolerances have to be used or more complicated circuit arrangements or other steps have to be taken to assure an acceptable intermediate brightness level is achieved. With a potentiometer, on the other hand, the user merely picks a slightly different setting of the potentiometer wiper to compensate for variations in component values. That is, the user merely turns the potentiometer knob until an intermediate brightness level is achieved.

Security mode also permits a manual override circuit to operate. Manual override is governed by op amp 19 and operates as follows. Assume the lamp 10 is not energized and the user desires to manually override the motion detector and turn on the light from the wall switch. When the user flips the wall switch from on to off, the −input of op amp 19 is the first to respond because this input is directly tied to the power supply through the voltage divider network composed resistors 58 and 59. The voltage divider composed of resistors 61 and 62 ensures the +input will be slightly lower than the −input, thereby disabling op amp 19. But capacitor 63 holds a full charge. When the power is switched off, capacitor 63 begins to discharge. Capacitor 63 typically has a time constant of about 3 seconds. If the power is restored within 3 seconds, i.e., within the time constant, sufficient charge will remain on capacitor 63 to assure that the +input of op amp 19 is higher than the −input. This produces a High at the output of op amp 19, which is applied through diode 64 to the triac-firing circuit to turn on light 14. The High output is also applied to the +input through feedback resistor 66 to maintain the High output so that the light remains energized. The light will remain on either until daylight activates the photocell 67 or until the wall switch is again toggled. Now when the wall switch is toggled, capacitor 63 is already discharged, so that there is no residual charge to set the High at the output of op amp 19, which consequently goes to its Low state and normal security mode operation continues.

During daylight the photocell 67 is conducting and causes a low voltage to be applied to the non-inverting input of op amp 17. This shuts down the op amp, causing a Low to appear at its output. This in turn disables op amps 18, 19 and 23 by applying the Low at the output of op amp 17, to the +input of op amp 18 through diode 68, to the +input of op amp 19 through diode 69, and to the +input of op amp 23 through diode 70. Thus, during daylight op amp 23 is unable to send a triggering signal to the triac, op amp 19 is unable to respond to the manual override toggling of the wall switch, and op amp 18 is unable to provide a Background Lighting Level signal and hence is unable to trigger the triac at either the intermediate brightness level of the accent mode or the full brightness of the dusk-to-dawn mode.

In some embodiments it may be desirable to activate other features, characteristics or functions when the motion detector is in a particular mode of operation. The Background Lighting Level signal provided by op amp 18 on line 54 provides an ideal way of identifying and distinguishing the mode in which the motion detector is operating. By way of example, it may be desirable in one embodiment of motion-activated lighting to have a motion detector with a manual override feature that operates in Security mode but does not operate in Accent mode. Accent mode always provides at least an accent level of illumination at night so it will generally be unnecessary to energize the light at a brighter level in the absence of a person moving about in the region covered by the motion detector. Whether the manual override operates in dusk to dawn mode is moot since the light is always on in this mode and so there is nothing to override. The circuit of FIG. 1 provides this feature by applying the Background Lighting Level signal along line 71 labeled "Override Disable" to the inverting input of the manual override op amp 19. If the motion detector is in Security mode, then the Background Lighting Level signal is a logic Low, and it will have no effect on the operation of op amp 19. If the motion detector is in accent mode, however, the Background Lighting Level signal will be a pulse train providing a logic High pulse for some portion of every AC cycle. The logic High blanks out op amp 19 so that it cannot function properly for a long enough duration to complete the toggling operation needed to activate the manual override.

Figure 2:
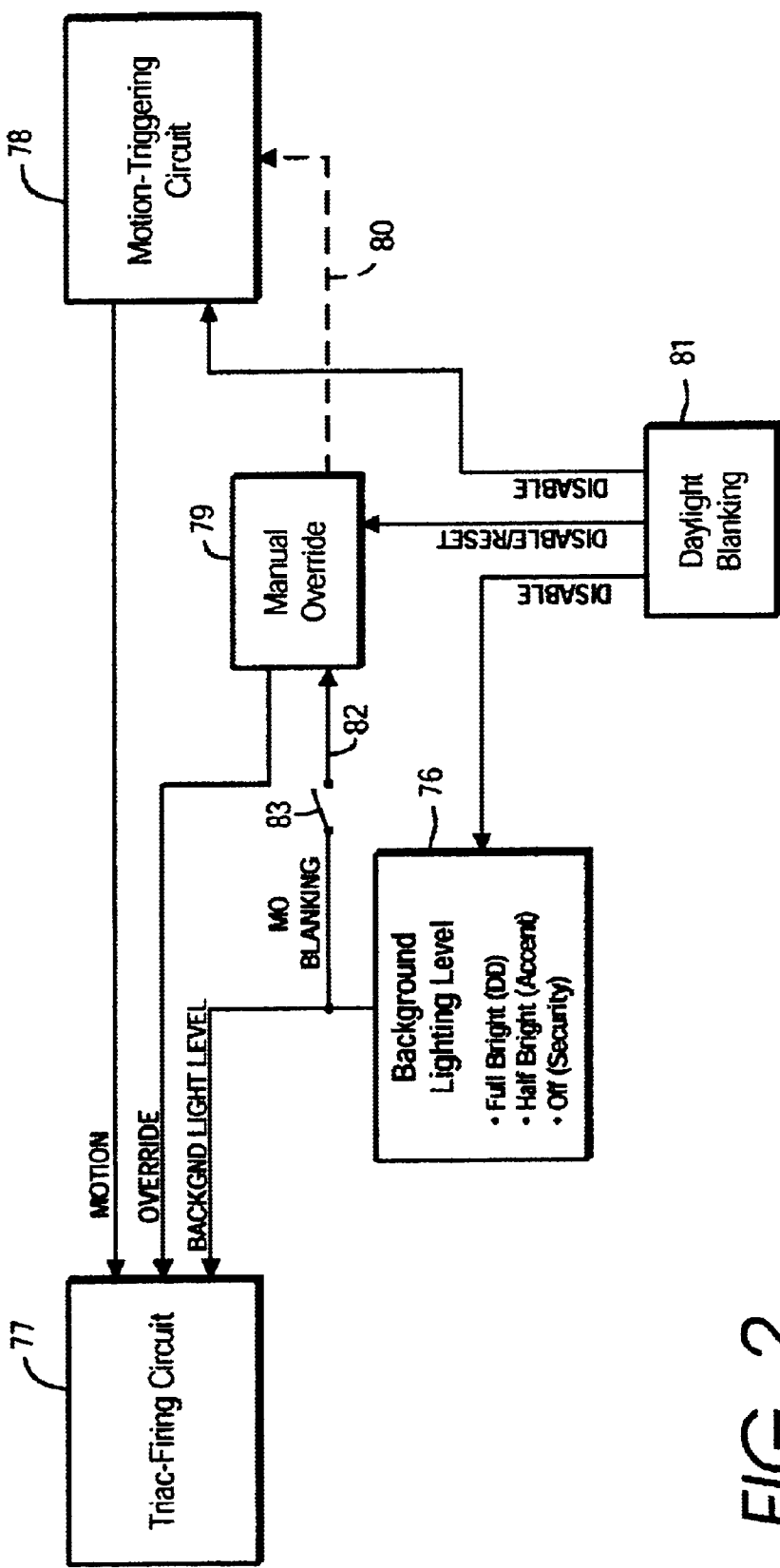
FIG. 2 is a high-level block diagram of the circuit of FIG. 1 showing an example of a dual-use background lighting level signal.

The dual use of the Background Lighting Level signal is illustrated more generally with reference to FIG. 2. The circuitry at block 76 generates several different background lighting levels, that is, the lighting levels in the absence of any detection of motion. Block 76 shows three levels that are generally selectable by a user in many common motion detectors. This signal is applied to triac-firing circuit 77 for energizing the light regardless of the state of motion. Motion is detected independently of the Background Lighting Level by Motion-Triggering Circuit 78, which applies its own independent Motion signal to triac-firing circuit 77 for energizing the light whenever motion is detected. Manual override circuit 79 causes the triac-firing circuit to energize the light at full brightness. In some motion detectors this is achieved by applying an Override signal directly to the triac-firing circuit as indicated by the solid Override line in FIG. 2. In other embodiments the manual override circuit operates indirectly by applying an Override signal to the motion-triggering circuit 78 causing the motion-triggering circuit to apply a motion signal to the triac-firing circuit and locking the motion-triggering circuit into this state until the manual override is released. The indirect action of the manual-override circuit is indicated by the dashed line 80 in FIG. 2. Daylight blanking circuit 81 overrides all other circuits during daylight and resets the manual override circuit so as to release any manual overriding action that may still be in effect at daylight. The dual use of the Background Lighting Level signal is illustrated in FIG. 2 at line 82, where the signal is applied to manual override circuit 79 to disable the manual override action when the appropriate background lighting level is indicated by the Background Lighting Level signal. FIG. 2 also shows a switch 83 by which the Manual Override blanking may be selected or deselected at user discretion. FIG. 2 illustrates the Background Lighting Level signal being applied directly to disable the manual override circuitry 79. In some circuit embodiments it may be necessary or desirable to scale or otherwise condition the Background Lighting Level signal before applying it to the manual override or other feature, characteristic or function. The notion of a dual use Background Lighting Level signal as used herein encompasses such scaled or conditioned Background Lighting Level signals. Other configurations are also possible. For example, the Background Lighting Level signal may alternatively be applied to an electronic switch for switching on or off the manual override. In those embodiments represented by the dashed control line 80, the circuitry may alternatively be configured to apply the Background Lighting Level signal a switch in line 80 for effectively disabling the manual override.

The above descriptions and drawings are given to illustrate and provide examples of various aspects of the invention in various embodiments. It is not intended to limit the invention only to these examples and illustrations. Given the benefit of the above disclosure, those skilled in the art may be able to devise various modifications and alternate constructions that although differing from the examples disclosed herein nevertheless enjoy the benefits of the invention. For example, given the teachings and motivations provided herein those skilled in the art may find other features, characteristics and functions that may be selectively enabled or disabled by the Background Lighting Level signal. Although such configurations may not be expressly described herein, they may nevertheless fall within the scope of the invention, which is defined by the following claims.

What is claimed is:

1. A method of operating a motion detector circuit adapted for energizing a light when motion is detected, the circuit providing a plurality of user selectable modes of operation, each mode producing a characteristic background lighting level in the absence of motion, the method comprising:

providing a lighting level signal for indicating the background level at which said light is to be energized in the absence of motion in said plurality of modes of operation;

applying said lighting level signal so as to cause said light to be energized at the background level associated with a user selected mode of operation; and applying said lighting level signal so as to effectuate one or more features, characteristics or functions associated with said user selected mode of operation other than the characteristic background lighting level.

2. The method of claim 1 wherein said circuit includes a manual override feature and said plurality of modes of operation includes an accent mode of operation, wherein said step of applying said lighting level signal so as to effectuate one or more features, characteristics or functions comprises applying said lighting level signal so as to disable said manual override feature in said accent mode.

3. A circuit arrangement for use in a PIR motion-activated light, said circuit arrangement including a PIR motion detector for energizing said light at a nominal full-brightness illumination level in response to motion and further including background level circuitry for setting a plurality of background lighting levels in the absence of motion, said circuit arrangement being characterized in that:

said background level circuitry provides a dual use background lighting level signal;

said dual use lighting level signal is applied to effectuate a selected background lighting level from said plurality of background lighting levels; and said dual use lighting level signal is further applied to set at least one other feature, characteristic or function of said motion-activated light associated with said selected background level other than the setting of the background lighting level.

4. The circuit arrangement of claim 3 further including a manual override, said circuit arrangement being further characterized in that:

said dual use lighting level signal is applied to disable said manual override in response to said dual use lighting level signal indicating a background lighting level greater than zero, whereby a manual override function is set only for zero background lighting level.

5. Motion detector circuitry for energizing a light, the motion detector circuitry providing a security mode of operation, an accent mode of operation and a dusk to dawn mode of operation and a manual override, characterized in that:

said manual override is disabled in said accent mode; and
said manual override is enabled in said security mode.

6. Motion detector circuitry for energizing a light, the motion detector circuitry providing a security mode of operation, an accent mode of operation and a dusk to dawn mode of operation and including a triac circuit for energizing said light and a manual override, characterized in that:

said circuitry defines a lighting level signal for indicating the background level at which said light is to be energized in the absence of motion in said security mode and in said accent mode, said lighting level signal providing a non-energizing level in said dusk to dawn mode;

said lighting level signal is applied to said triac circuit for effectuating a background lighting level in the absence of motion; and wherein said lighting level signal is applied to disable said manual override when said lighting level signal is greater than the non-energizing level.

7. In a PIR motion detector circuit for energizing a light in an accent mode of operation, said motion detector circuit being adapted for connection to an AC power source and including a triac circuit for electrically connecting said light to said AC power source in response to a firing signal, the improvement comprising:

a first voltage divider for receiving an AC power signal from said source and providing a first voltage divided AC signal;

a second voltage divider for receiving said AC power signal from said source and providing a second voltage divided AC signal different from said first voltage divided AC signal;

a phase shifting network for shifting the relative phase of said first and second voltage divided AC signals; and a comparator receiving the phase shifted first and second voltage divided AC signals and providing a pulsed signal for firing said triac circuit at an accent lighting level.

8. The circuit of claim 7, further comprising a variable resistance for adjusting at least one of the voltage magnitude or phase of one of said first and second voltage divided AC signals, whereby the duty cycle of said pulsed signal may be adjusted for adjusting said accent lighting level.

9. The circuit of claim 7, further comprising:

a daylight blanking op amp for providing a characteristic output during daylight, said characteristic output being applied to disable said comparator for disabling said accent mode during daylight.

* * * * *